United States Patent [19]
Buschmann et al.

[11] Patent Number: 6,086,515
[45] Date of Patent: Jul. 11, 2000

[54] PROCESS AND SYSTEM FOR RETAINING A VEHICLE ON AN INCLINED ROADWAY

[75] Inventors: Gunther Buschmann, Idstein; Karlheinz Haupt, Gau-Algesheim; Thomas Kuzel, Hanau, all of Germany

[73] Assignee: ITT Manufacturing Enterprises Inc., Wilmington, Del.

[21] Appl. No.: 09/029,321

[22] PCT Filed: Jul. 3, 1996

[86] PCT No.: PCT/EP96/02910

§ 371 Date: Apr. 27, 1998

§ 102(e) Date: Apr. 27, 1998

[87] PCT Pub. No.: WO97/02969

PCT Pub. Date: Jan. 30, 1997

[30] Foreign Application Priority Data

Jul. 13, 1995 [DE] Germany ............................ 195 25 552

[51] Int. Cl.⁷ .................................................... B60T 7/12
[52] U.S. Cl. ......................... 477/194; 477/195; 477/198; 303/191
[58] Field of Search ...................................... 477/194, 195, 477/196, 197, 198, 199; 303/191

[56] References Cited

U.S. PATENT DOCUMENTS

| | | | |
|---|---|---|---|
| 4,867,291 | 9/1989 | Holman et al. | 192/7 X |
| 5,137,127 | 8/1992 | Braun | 477/196 X |
| 5,791,750 | 8/1998 | Spiegelberg | 477/194 X |

*Primary Examiner*—Khoi Q. Ta
*Attorney, Agent, or Firm*—Rader, Fishman & Crauer PLLC

[57] ABSTRACT

To retain a vehicle on an inclined roadway and when starting uphill, the vehicle speed, the brake pedal application, the drive torque, the operating condition of the vehicle engine, the application of a parking brake, and the activation of the retaining system is determined. When the retaining system is activated and the vehicle speed lies below a limit value, the brake force or the braking pressure is maintained when the brake pedal is applied and no drive torque is sensed; the brake force is increased when the driving engine is switched off and neither the brake pedal nor the parking brake is activated, or when the engine is switched on and neither brake pedal application nor drive torque is sensed. The brake force is reduced when the parking brake is applied, with the engine switched off and the brake pedal not applied, or a drive torque is sensed with the engine switched on. The retaining system is deactivated when the vehicle speed threshold is exceeded and/or when the off-switch is activated.

A warning signal can be triggered by a door contact and/or a seat contact.

5 Claims, 2 Drawing Sheets

| VREF | EAS | MO | AM | BLS | FB | Case: | Reaction |
|---|---|---|---|---|---|---|---|
| 0 | 1 | 0 | 0 | 0 | 0 | B | pressure increase |
| 0 | 1 | 0 | 0 | 0 | 1 | C | pressure decrease |
| 0 | 1 | 0 | 0 | 1 | 0 | A | pressure is maintained |
| 0 | 1 | 1 | 0 | 0 | 0 | B | pressure increase |
| 0 | 1 | 0 | 0 | 1 | 1 | A | pressure is maintained |
| 0 | 1 | 1 | 0 | 0 | 1 | B | pressure increase |
| 0 | 1 | 1 | 0 | 1 | 0 | A | pressure is maintained |
| 0 | 1 | 1 | 1 | 0 | 0 | C | pressure decrease |
| 0 | 1 | 1 | 0 | 1 | 1 | A | pressure is maintained |
| 0 | 1 | 1 | 1 | 0 | 1 | C | pressure decrease |
| 0 | 1 | 1 | 1 | 1 | 0 | C | pressure decrease |
| 0 | 1 | 1 | 1 | 1 | 1 | C | pressure decrease |
| 1 | 0/1 | 0/1 | 0/1 | 0/1 | 0/1 | D | pressure withdrawl |
| 0/1 | 0 | 0/1 | 0/1 | 0/1 | 0/1 | D | pressure withdrawl |

| VREF | EAS | MO | AM | BLS | FB | Case: | Reaction |
|---|---|---|---|---|---|---|---|
| 0 | 1 | 0 | 0 | 0 | 0 | B | pressure increase |
| 0 | 1 | 0 | 0 | 0 | 1 | C | pressure decrease |
| 0 | 1 | 0 | 0 | 1 | 0 | A | pressure is maintained |
| 0 | 1 | 1 | 0 | 0 | 0 | B | pressure increase |
| 0 | 1 | 0 | 0 | 1 | 1 | A | pressure is maintained |
| 0 | 1 | 1 | 0 | 0 | 1 | B | pressure increase |
| 0 | 1 | 1 | 0 | 1 | 0 | A | pressure is maintained |
| 0 | 1 | 1 | 1 | 0 | 0 | C | pressure decrease |
| 0 | 1 | 1 | 0 | 1 | 1 | A | pressure is maintained |
| 0 | 1 | 1 | 1 | 0 | 1 | C | pressure decrease |
| 0 | 1 | 1 | 1 | 1 | 0 | C | pressure decrease |
| 0 | 1 | 1 | 1 | 1 | 1 | C | pressure decrease |
| 1 | 0/1 | 0/1 | 0/1 | 0/1 | 0/1 | D | pressure withdrawl |
| 0/1 | 0 | 0/1 | 0/1 | 0/1 | 0/1 | D | pressure withdrawl |

Fig. 2

PROCESS AND SYSTEM FOR RETAINING A VEHICLE ON AN INCLINED ROADWAY

BACKGROUND OF THE INVENTION

The present invention relates to a method of retaining a vehicle on an inclined roadway and when starting uphill, wherein the brake force on individual or on several vehicle wheels, in particular, on the wheels of one axle is generated, namely maintained, increased and decreased again, in consideration of the vehicle speed, the brake pedal application, or corresponding criteria. Arrangements for implementing the method are also covered by the present invention.

Inadvertent rolling of a vehicle on an inclined roadway is prevented, and starting uphill is facilitated, even for an unskilled person, by such retaining aids or retaining systems, which are referred to as 'hill holders'. Retaining systems of this type enhance the comfort and prevent crashes caused by inattentiveness, clutch damages due to operator errors, etc.

German patent No. 34 39 067 discloses an arrangement for arresting a pressure-fluid-operated wheel brake wherein components of the brake system, which are per se provided for anti-lock control, are used to retain the vehicle. When the brake pedal is released, the braking pressure in this prior art arrangement is reduced only to a predetermined residual pressure which is sufficient to retain the vehicle. To release the wheel brake, a multi-way valve inserted into the pressure fluid path is switched to open on command of a signal issued by the driver or responsive to the driving behavior of the vehicle or the rotational behavior of the wheels.

German patent application No. 40 23 705 describes an arrangement for retaining a vehicle when starting uphill which has an electrically operable actuator that acts by way of a linkage or a Bowden cable on the parking brake of the vehicle. The associated electronics for controlling the actuator is provided with input signals of wheel sensors and switches coupled to the accelerator pedal, the transmission, the clutch, etc.

An object of the present invention is to provide a method which makes it easier to the driver to retain the vehicle and start uphill in various situations. As the situation may be, the method shall intervene in the brake system in the suitable fashion.

SUMMARY OF THE INVENTION

It has been found that this object can be achieved by providing that the brake force is maintained or kept constant, increased or decreased in response to the respective situation, or in adapting to the respective circumstances. The following input data are acquired and evaluated as a criterion for the respective situation and the driver's wish:

vehicle (reference) speed, brake pedal application, drive torque (or clutch and accelerator pedal actuation), operating condition (on/off) of the driving engine or starting of the ignition, actuation of the parking brake, and switch condition (on/off) of the retaining system.

The driver's wish is concluded from logically combining and evaluating the input signals, and the pressure is modulated in a suitable manner. The retaining system is deactivated when a vehicle speed threshold is exceeded or when an on/off switch is activated.

For safety considerations, a warning signal is triggered by a door contact as soon as the driver's door is opened, with the retaining system activated, according to a preferred aspect of the present invention. Also, it is an advantage to provide a seat contact instead of, or in addition to, the door contact. When the retaining system is activated, the seat contact triggers a warning signal as soon as the driver's seat is relieved from load.

An arrangement for implementing the method of the present invention includes that the arrangement is provided in the shape of or as a component of a hydraulic brake system, more particularly as a component of a brake system equipped with a traction slip control system, and that pressure is introduced and modulated in the wheel brakes to generate and control the brake force.

Further features, advantages and details of the present invention can be taken from the following description, making reference to the accompanying drawings.

BRIEF DESCRIPTION OF THE DRAWINGS

In the drawings,

FIG. 2 is a table showing the logic combining of the switch signals evaluated according to an embodiment of the present invention.

DETAILED DESCRIPTION OF THE DRAWINGS

Figure 1:
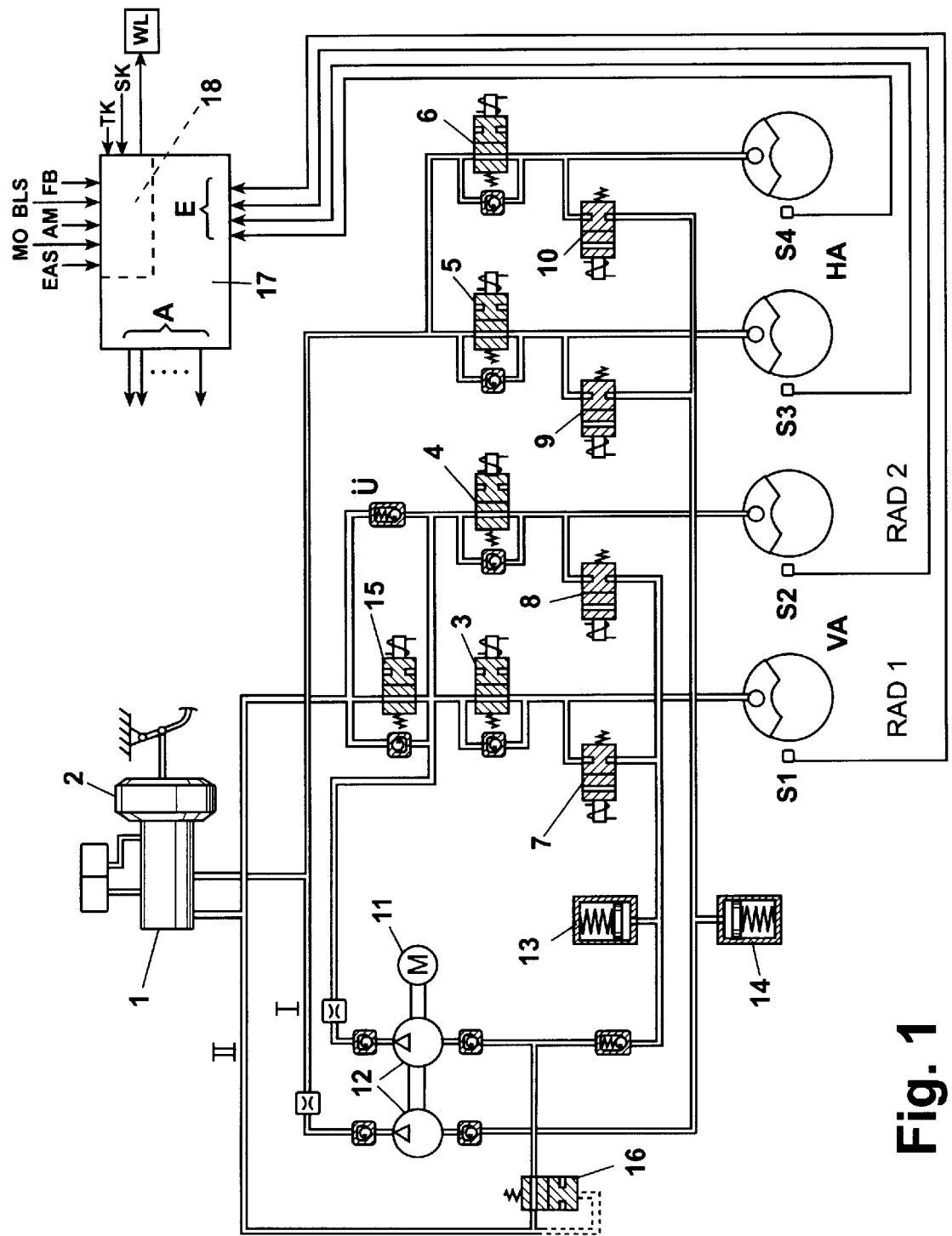
FIG. 1 is a schematic view of the basic components of an arrangement for implementing the method of the present invention on the basis of a brake system with anti-lock and traction slip control.

The arrangement of FIG. 1 is mainly used for anti-lock control and traction slip control by brake management. The brake system has two circuits. The non-driven vehicle wheels, herein the wheels of the rear axle HA, are connected to brake circuit I, and the wheels of the front axle VA are connected to brake circuit II.

The brake system includes a tandem master cylinder 1 preceded by a vacuum booster 2. Associated with each vehicle wheel is an inlet valve 3, 4, 5, 6 which is open in the inactive position and an outlet valve 7, 8, 9, 10 which is closed in the inactive position. A dual-circuit hydraulic pump 12 with a joint driving engine 11 is provided to return the pressure fluid which is discharged through the outlet valves 7, 8, 9, 10 in the pressure reduction period of a control operation. Further, each brake circuit I, II includes a low-pressure accumulator 13, 14 which, as is known in the art, takes up pressure fluid in the initial phase of anti-lock control and thereby accelerates the initial pressure reduction.

The branch of the hydraulic pump 12 feeding the brake circuit II also ensures the braking pressure generation during a traction slip control operation. A separating valve 15 which is interposed in the pressure fluid conduit from the master cylinder 1 to the wheel brakes of the driven wheels is required for braking pressure build-up during a traction slip control operation. In the traction slip control phase, pressure fluid from the master cylinder 1 is conducted by way of a hydraulically operated two-way/two-position directional control valve 16 to the suction side of the hydraulic pump 12 of the hydraulic circuit II.

A pressure-relief valve Ü limits the pressure which develops by the delivery of the pump 12 during traction slip control operations to a predefined maximum value.

Each vehicle wheel has a wheel sensor S1 to S4. The output signals of the sensors are sent to the inputs E of an electronic controller 17 which evaluates the signals and furnishes braking pressure control signals through its outputs A for the actuation of the inlet and outlet valves 3, 4, 5, 6 and 7, 8, 9, 10 and the separating valve 15 and for switching on and off of the pump drive motor 11.

The additional circuits, functions or program parts for implementing the method of the present invention are represented by a part 18 of a controller 17, marked in dotted lines. Signal lines EAS, MO, AM, FB and BLS (shown by arrows) which are required only or in first line for arresting the vehicle or for implementing the method of the present invention lead to the controller part or program part 18. However, the output signal of a switch 'BLS' (of a brake light switch) is used also for a pure anti-lock and/or traction slip control system in the majority of cases. 'EAS' refers to the on/off-switch of the retaining system, 'MO' designates a switch which indicates the operating condition of the vehicle driving engine or that the ignition is switched on. The signal 'AM' indicates whether a torque exists. Engagement of the vehicle clutch with simultaneous application of the accelerator pedal can also be evaluated as 'drive torque' (AM=1). Actuating or pulling of the parking brake of the vehicle (FB=1) is signalled by way of the input 'FB'.

Further, in the embodiment of the present invention shown, the controller part or program part 18 responsible for the retaining system is connected to a door contact switch Tk and a seat contact switch Sk by way of signal lines. Safety functions of different types can be realized by way of these contacts.

FIG. 1 also represents a signal line which leads to a warning lamp WL and/or an audible signal generator. The retaining system issues a warning signal by way of the signal line in certain situations.

Anti-lock control is performed in a known fashion by way of the inlet valves 3, 4, 5, 6 and the outlet valves 7, 8, 9, 10. Pump 12 returns the pressure fluid discharged by way of the outlet valves into the brake circuits I, II or the master cylinder 1. The separating valve 15 is open in the traction slip control mode to permit the introduction of pressure fluid into the front-wheel brakes by way of pump 12 in this situation where the master cylinder 1 is unpressurised.

FIG. 2 shows the operation of the method of the present invention. 'Possible' signal combinations, indicative of the various situations, to which the retaining system of the invention reacts in a suitable manner are shown. The non-illustrated signal combinations are physically not possible or of no significance for the method of the present invention.

'0' and '1' are the two switch positions of the signals employed. 'VREF' represents the vehicle (reference) speed. The other switch symbols are identical with the input signals leading to the controller part 18 (see FIG. 1).

As can be seen in FIG. 2, only those situations are of interest to the retaining system where the vehicle (reference) speed VREF is below a limit value (VREF=0) and the retaining system is activated (EAS=1).

In this situation, the braking pressure is 'maintained' (case A), when no torque is sensed (AM=0), but the operating brake is applied (BLS=1). As mentioned before, an engaged clutch and simultaneous accelerator pedal application can also be evaluated as a signal for the existence of drive torque. This is not illustrated in detail.

The brake force or the braking pressure is 'increased' (case B) when the driving engine is switched off and neither the brake pedal nor the parking brake is activated and no drive torque is sensed, namely with

MO, AM, BLS, FB=0, or when the driving engine is switched on and neither brake pedal application nor drive torque is sensed, namely with

MO=1, BLS=0, AM=0.

'Reduction' of the braking pressure (case C) caused by the retaining system of the present invention is achieved when the parking brake is applied, the drive engine is switched off and the brake pedal is not applied, namely with

MO=0, BLS=0, FB=1, or when a drive torque is sensed when the vehicle engine is switched on, namely in the situation

MO=1, AM=1.

Further, it can be seen in FIG. 2 that when (case D) the vehicle (reference) speed exceeds the predetermined threshold value (VREF=1) or the retaining system is deactivated (EAS=0) (irrespective of the level of the other signals), the retaining system of the present invention 'withdraws from' the control.

In the embodiment of the present invention shown, an information which is important for the retaining system is produced by way of the door contact switch Tk and/or the seat contact switch Sk (see FIG. 1). Opening of the door and, thus, activation of the door contact switch or relief of the driver's seat from load indicates the intention of the driver to leave the vehicle. When the retaining system is activated (EAS=1), the warning lamp WL will be actuated and/or a safety function will be triggered in this case. It may be suitable, for example, to maintain the function of the retaining system by maintaining constant or increasing the brake force or the braking pressure for a determined, given interval which starts with the passenger getting out of the vehicle or with the contact being triggered.

It could also be favorable to slowly reduce the braking pressure after opening of the door, namely, in a few seconds, in order to induce the driver to take the initiative by applying the parking brake or in any other manner. Most different safety functions are possible by means of the retaining system of the present invention, and by logically combining the described input signals.

It should be noted for the sake of completeness that the method of the present invention and the described arrangement can also be employed in connection with vehicles equipped with automatic transmissions or automatic clutches. Logic combining with still other input signals which are important for arresting the vehicle and for the behavior of the driver are also possible.

We claim:

1. A method of retaining a vehicle on an inclined roadway and when starting uphill, the vehicle including a plurality of wheels arranged on at least two axles, a drive unit generating a drive torque, a brake system operated by a brake pedal, a parking brake operable independently from the brake system wherein, a brake force on at least one vehicle wheel is controlled according to sensed vehicle conditions, including at least one of vehicle speed, brake pedal application, a drive torque is determined, a current operating condition of the drive unit is determined, the method comprising the steps of, as long as a retaining system is switched on and the vehicle speed is below a limit value, maintaining the brake force when the brake pedal is applied and no drive torque is sensed;

increasing the brake force when at least one of the following conditions occurs:
- the drive unit is switched off and neither the brake pedal nor the parking brake is activated,
- the driving engine is switched on and neither brake pedal application nor drive torque is sensed;

reducing the brake force when at least one of the following conditions occurs:
- the parking brake is applied,
- the engine is switched off and the brake pedal is not applied,
- the engine is switched on and a drive torque is sensed;

deactivating the retaining system when at least one of the following conditions occurs:
- the vehicle speed threshold is exceeded,
- movements of the vehicle are sensed,
- the retaining system is manually switched off.

2. A method as claimed in claim 1 for a vehicle with a driver's door, wherein a warning signal is triggered by a door contact as soon as the driver's door is opened, with the retaining system activated.

3. A method as claimed in claim 1 for a vehicle with a driver's seat, wherein, when the retaining system is activated, a warning signal is triggered by a seat contact in the driver's seat as soon as the driver's seat is relieved from load.

4. A method as claimed in claim 1, wherein the retaining system is deactivated in response to an activation of a contact indicating that no driver is in the vehicle.

5. A method as claimed in claim 1 for a vehicle with an accelerator pedal and with a clutch in a transmission line between drive unit and wheels, wherein the engagement of the clutch in the transmission line of the vehicle in connection with an accelerator pedal application is evaluated as a signal for the existence of a drive torque.

* * * * *